US010414071B2

(12) United States Patent
Kellij et al.

(10) Patent No.: US 10,414,071 B2
(45) Date of Patent: Sep. 17, 2019

(54) CONVEYOR AND METHOD FOR CONVEYING A TIRE COMPONENT

(71) Applicant: VMI Holland B.V., Epe (NL)

(72) Inventors: Egbert Grietinus Kellij, Epe (NL); Karel Johannes Van Assenbergh, Epe (NL); Thijs Hubert Rupert, Epe (NL); Ruud Albertus Gerhardus Hesselink, Epe (NL)

(73) Assignee: VMI HOLLAND B.V. (NL)

( * ) Notice: Subject to any disclaimer, the term of this patent is extended or adjusted under 35 U.S.C. 154(b) by 100 days.

(21) Appl. No.: 15/552,239

(22) PCT Filed: Feb. 26, 2016

(86) PCT No.: PCT/NL2016/050137
§ 371 (c)(1),
(2) Date: Aug. 18, 2017

(87) PCT Pub. No.: WO2016/137324
PCT Pub. Date: Sep. 1, 2016

(65) Prior Publication Data
US 2018/0029250 A1    Feb. 1, 2018

(30) Foreign Application Priority Data
Feb. 27, 2015    (NL) ...................... 2014365

(51) Int. Cl.
*B29C 31/08*    (2006.01)
*B65G 47/82*    (2006.01)
(Continued)

(52) U.S. Cl.
CPC ............ *B29C 31/085* (2013.01); *B29C 31/08* (2013.01); *B29D 30/3007* (2013.01);
(Continued)

(58) Field of Classification Search
CPC .... B29D 30/3007; B29D 30/58; B65G 19/02; B65G 19/185; B65G 19/225;
(Continued)

(56) References Cited

U.S. PATENT DOCUMENTS 3,061,303 A    10/1962    Glaser et al. .................. 271/61
3,064,783 A *  11/1962    McClelland, Jr. ... B65G 11/023
                                                      193/38
(Continued)

FOREIGN PATENT DOCUMENTS

CN    102030170    4/2011    ............ B65G 11/02
DE    1245111      7/1967    ............ B29D 30/42
(Continued)

OTHER PUBLICATIONS

International Search Report and Written Opinion issued in application No. PCT/NL2016/050137, dated Jun. 22, 2016 (11 pgs).
(Continued)

*Primary Examiner* — Gene O Crawford
*Assistant Examiner* — Keith R Campbell
(74) *Attorney, Agent, or Firm* — Hayes Soloway P.C.

(57) ABSTRACT

Provided is a conveyor for conveying a tire component, in particular a tread for retreading, wherein the conveyor includes a support surface that extends in a direction of conveyance to support the tire component during conveyance in the direction of conveyance, wherein the support surface is provided with a surface structure that is arranged to contact seventy-five percent or less than seventy-five percent of the downwardly facing surface area of the tire component, wherein the support surface is arranged to be held stationary during conveyance of the tire component and wherein the conveyor is provided with one or more manipulators to manipulate the position of the tire component on the
(Continued)

stationary support surface by sliding the tire component over the stationary support surface.

24 Claims, 6 Drawing Sheets

(51) Int. Cl.
  *B29D 30/30* (2006.01)
  *B29D 30/58* (2006.01)
(52) U.S. Cl.
  CPC ............. *B29D 30/58* (2013.01); *B65G 47/82* (2013.01); *B65G 2201/0273* (2013.01)
(58) Field of Classification Search
  CPC .. B65G 19/303; B65G 21/2072; B65G 47/24; B65G 47/244; B65G 47/82; B65G 2201/0273; B29C 31/08; B29C 31/085
  See application file for complete search history.

(56) References Cited

U.S. PATENT DOCUMENTS

| | | | | |
|---|---|---|---|---|
| 3,895,982 A | 7/1975 | Persson | | 156/71 |
| 3,949,920 A | 4/1976 | Habert et al. | | 226/198 |
| 4,386,273 A * | 5/1983 | Jones | | B29D 30/3007 250/548 |
| 4,913,018 A * | 4/1990 | Bailey | | B29D 30/3007 83/155 |
| 5,389,187 A * | 2/1995 | Marks | | B29D 30/44 156/130 |
| 5,882,457 A * | 3/1999 | Currie | | B29D 30/3007 156/128.1 |
| 5,915,611 A * | 6/1999 | Baldoni | | B29D 30/3007 226/172 |
| 9,132,596 B2 * | 9/2015 | Wedekind | | B29D 30/3007 |

FOREIGN PATENT DOCUMENTS

| | | | | |
|---|---|---|---|---|
| DE | 1904481 | 8/1970 | ............ | B29D 30/30 |
| DE | 2325672 | 12/1974 | ............ | B29D 30/30 |
| EP | 0104339 | 4/1984 | ............ | B29C 67/00 |
| KR | 100985065 | 10/2010 | ............ | B65G 11/02 |
| NL | 2013038 | 6/2014 | ............ | B29D 30/44 |
| WO | WO2013088269 | 6/2013 | ............ | B29D 30/30 |

OTHER PUBLICATIONS

International Preliminary Report on Patentability issued in application No. PCT/NL/2016/050137, dated Feb. 6, 2017 (15 pgs).

* cited by examiner

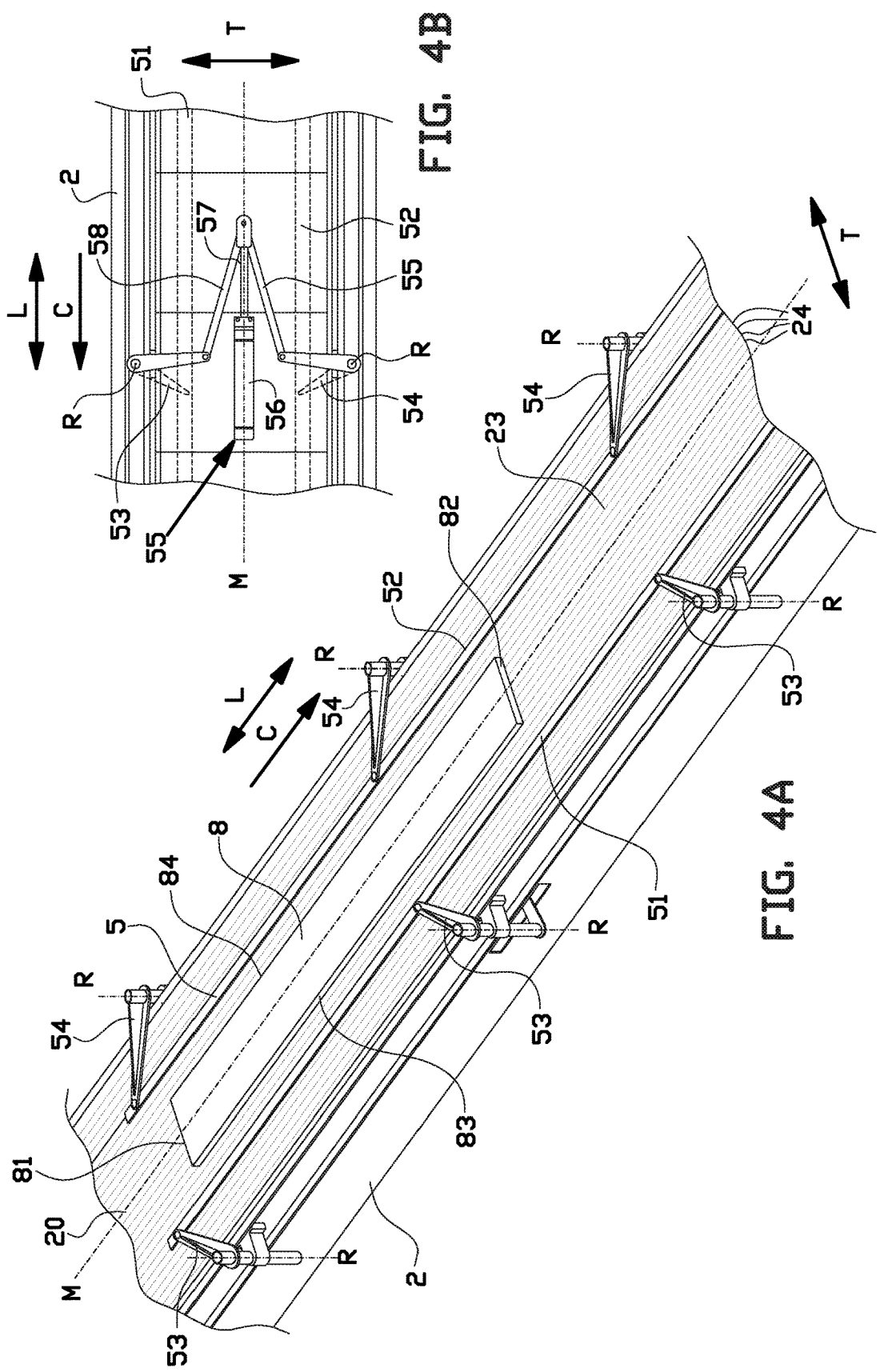

CONVEYOR AND METHOD FOR CONVEYING A TIRE COMPONENT

BACKGROUND

The invention relates to a conveyor and method for conveying a tire component, in particular a tread for retreading.

Known conveyors for retreading comprise rollers which are actively driven to convey a fresh tire tread to a buffed carcass at the downstream end of the conveyor. These known roller conveyors are complex, expensive and require frequent maintenance to prevent down time. Furthermore, complex gripping means, such as vacuum cups, magnets and/or jaws are used to pick up and clamp the tire component during handling.

DE 1 904 481 A discloses a device for feeding a tread strip to a pressing machine. The device comprises a supply table and a transporting means for transporting the tread over the supply table towards the pressing machine. DE 1 904 481A teaches that the surface of the supply table has to be 'even and smooth' to generate as little friction as possible between the tread and the supply table during sliding of said tread over the supply table. Although the known supply table is relatively simple and requires less maintenance compared to a roller conveyor, dust and other particles will be collected on its surface over time, reducing its smoothness. The support table thus still requires regular maintenance. Furthermore, it is very hard to pick up the tread from the supply table for handling purposes. DE 1 904 481 A employs a transporting means with pins that are inserted into the tread from above to grip and displace the tread over the supply table. Disadvantages of the pins is that they do not securely hold the tread and that they damage the tread.

It is an object of the present invention to provide an alternative conveyor and method for conveying a tire component, wherein the complexity, costs and/or maintenance requirements of the conveyor can be reduced and/or wherein the handling of the tread can be improved.

SUMMARY OF THE INVENTION

According to a first aspect, the invention provides a conveyor for conveying a tire component, in particular a tread for retreading, wherein the conveyor comprises a support surface that extends in a direction of conveyance to support the tire component during conveyance in the direction of conveyance, wherein the support surface is provided with a surface structure that is arranged to contact seventy-five percent or less than seventy-five percent of the downwardly facing surface area of the tire component, wherein the support surface is arranged to be held stationary during conveyance of the tire component and wherein the conveyor is provided with one or more manipulators to manipulate the position of the tire component on the stationary support surface by sliding the tire component over the stationary support surface. Preferably, the surface structure is arranged to contact half or less than half of the downwardly facing surface area of the tire component.

Although surface structures to reduce friction have been applied in chutes, e.g. as disclosed in KR 100985065 B1, U.S. Pat. Nos. 3,064,783 A and 3,895,982 A, it is submitted that these known surface structures are typically arranged to guide relatively rigid articles, such as boxes, under the influence of gravity along a transport trajectory with several corners, bumps and drops. Such rigid articles are fundamentally different from elastic, easily deformable and tacky tire components. The known surface structures were therefore considered undesirable in the field of tire manufacturing at the time, mainly because of the prejudice that such surface structures would cause imprints on the deformable rubber material of tire components. The field generally followed the teaching of DE 1 904 481 A that the surfaces that come into contact with the tire components should be even and as smooth as possible. The applicant has rejected the prejudice and has found that the claimed surface structure can be used in the field of manufacturing tires, and in particular in the field of retreading tires because the tread, unlike other tire components, is relatively rigid and less susceptible to deformation. As there are no moving parts in the support surface, the complexity, costs and/or maintenance requirements of the conveyor according to the invention can be reduced significantly with respect to known conveyors.

The surface structure has additional advantages that have not been recognized by the prior art. These advantages will be described below in relation to the specific embodiments of the invention.

In an embodiment the support surface is corrugated. The corrugations can significantly reduce the contact area of the downwardly facing surface area of the tire component that is in contact with the support surface, thereby reducing the amount of resistance or friction to sliding of the support surface with respect to the tire component.

In an embodiment the corrugations extend in the direction of conveyance. Unlike the smooth surface of the supply table in DE 1 904 481 A, dirt or other particles which are collected in the corrugations during operation can be easily discharged in the direction of conveyance to keep the dirt or other particles from cluttering in the corrugations.

In an embodiment the one or more manipulators comprises a first manipulator that is arranged for sliding the tire component on the support surface in the direction of conveyance. The surface structure reduces friction and thus facilitates sliding of the tire component relative to the support surface. Thus, despite the support surface being stationary, the tire component can be moved in the direction of conveyance, e.g. towards a drum or a buffed carcass at the downstream end of the conveyor.

In an embodiment the first manipulator comprises a base plate and a drive for driving the base plate in a direction parallel to the direction of conveyance towards the tire component, wherein the base plate is provided with a plurality of teeth which are arranged to mesh with the corrugations and which form an inclined comb-like run-on surface for lifting the tire component onto the base plate when the base plate is moving towards the tire component. The tire component can thus be easily scooped up and lifted onto the base plate without using active lifting means or tread-damaging pins as in DE 1 904 481 A.

In an embodiment the first manipulator comprises a clamp unit for clamping the tire component. By clamping the tire component, its position can be easily manipulated by pulling or pushing it in a sliding movement over the support surface. The clamping can be considerably more secure than the gripping by pins as disclosed in DE 1 904 481 A.

In an embodiment the tire component has a leading end and a trailing end with respect to the direction of conveyance, wherein the clamp unit is arranged to clamp the trailing end of the tire component. The trailing end can thus be securely clamped and its position on the support surface can be controlled. This is particularly useful when retreading, as the length of the tread during winding application around the buffed carcass is usually controlled by controlling the position of the trailing end with respect to the leading end.

In an embodiment the first manipulator is arranged to push the tire component in the direction of conveyance. By pushing the tire component at its trailing end, the leading end can be moved without the need for clamping the leading end.

In an embodiment the first manipulator comprises a carriage that is arranged between the base plate and the clamp unit, wherein the carriage is arranged to be movable with respect to the base plate in a direction transverse or perpendicular to the direction of conveyance and wherein the clamp unit is arranged to be movable together with the carriage in said direction transverse or perpendicular to the direction of conveyance. The clamp unit can thus be moved relative to the base plate in said transverse direction to follow the trailing end when the trailing end is centered and/or aligned in said transverse direction.

In an embodiment the one or more manipulators comprises a second manipulator that is arranged to hold down the tire component on the support surface at a position downstream of the first manipulator in the direction of conveyance. This prevents that the tire component is prematurely lifted from the conveyor, e.g. near the transfer from the conveyor to the drum or the buffed carcass.

In an embodiment the one or more manipulators comprises a third manipulator that is arranged for sliding the tire component on the support surface in a direction transverse or perpendicular to the direction of conveyance. The surface structure reduces friction and thus facilitates sliding of the tire component relative to the support surface. Thus, despite the support surface being stationary, the tire component can be moved transverse or perpendicular to the direction of conveyance, e.g. for centering and/or alignment purposes.

In an embodiment the third manipulator is arranged for centering the tire component in the direction transverse or perpendicular to the direction of conveyance with respect to a center line. Thus the centering relative to the conveyor, the support surface and/or the drum or a buffed carcass may be improved.

In an embodiment the tire component comprises longitudinal edges, wherein the third manipulator comprises a first centering guide and a second centering guide which are movably placed on the support surface, one opposite to each of the longitudinal sides, wherein the first centering guide and the second centering guide are arranged to move symmetrically towards each other with respect to the center line into abutment with the respective longitudinal edges. The centering can thus be effectuated through a relatively simple mechanism which can be used for various widths of the tire component and which can optionally be operated without sensors, imaging or other means of detection.

In a preferred embodiment thereof the third manipulator comprises a first centering actuator which is arranged to actuate the symmetrical movement of the first centering guide and the second centering guide. This further simplifies the third manipulator as only one actuator is used to control the first centering guide and the second centering guide simultaneously. This reduces the costs and maintenance of the conveyor.

In an embodiment the first centering actuator comprises a single linear drive that is arranged to drive both the first centering guide and the second centering guide simultaneously. This even further simplifies the third manipulator as only a single actuator is used to control the first centering guide and the second centering guide simultaneously. The single actuator can be controlled by a single drive signal. Again, this reduces the costs and maintenance of the conveyor.

In a preferred embodiment thereof the first centering actuator comprises a first link mechanism and a second link mechanism that couple the single linear drive to the first centering guide and the second centering guide, respectively, for converting the driving movement of the single linear drive into the symmetrical movement of the first centering guide and the second centering guide. The link mechanisms can be kept relatively simple, low cost and low maintenance.

In an embodiment the one or more manipulators comprises a fourth manipulator that is placed downstream of the third manipulator in the direction of conveyance, wherein the fourth manipulator is arranged for moving the tire component on the support surface in a direction transverse or perpendicular to the direction of conveyance. The third manipulator and the fourth manipulator can be used in two centering stages, in which the third manipulator can center the tire component prior to conveyance and the fourth manipulator can center the tire component prior to transfer to the drum or a buffed carcass.

In an embodiment the fourth manipulator comprises a third centering guide and a fourth centering guide which are arranged to move symmetrically towards each other with respect to a center line into abutment with the respective longitudinal edges, wherein the third centering guide and the fourth centering guide are each provided with a plurality of wheels which are arranged to abut the respective longitudinal edge and which allow for movement of the tire component in the direction of conveyance relative to the fourth manipulator. By allowing relative movement of the tire component in the direction of conveyance, the fourth manipulator is able to center the tire component as it is being conveyed in the direction of conveyance.

In a preferred embodiment the third centering guide and the fourth centering guide are arranged to be symmetrical movable in the same manner as the first centering guide and the second centering guide, preferably driven by a second centering actuator similar to the first centering actuator for simultaneously driving the third centering guide and the fourth centering guide. Thus, the fourth manipulator can be kept equally simple, low cost and low maintenance as the third manipulator.

In a preferred embodiment the support surface is fixed with respect to the direction of conveyance and the direction transverse or perpendicular to the direction of conveyance. The support surface is thus not only held stationary during conveyance, but can be fixed to the conveyor and can thus be rendered immovable with respect to the conveyor.

According to a second aspect, the invention provides a conveyor for conveying a tire component, in particular a tread for retreading, wherein the conveyor comprises a support surface that extends in a direction of conveyance to support the tire component during conveyance in the direction of conveyance, wherein the support surface is provided with corrugations extending in the direction of conveyance, wherein the conveyor is provided with one or more manipulators to manipulate the position of the tire component, wherein the one or more manipulators comprises a first manipulator that is provided with a base plate and a drive for driving the base plate in a direction parallel to the direction of conveyance towards the tire component, wherein the base plate is provided with a plurality of teeth which are arranged to mesh with the corrugations and which form an inclined comb-like run-on surface for lifting the tire component onto the base plate when the base plate is moving towards the tire component.

The tire component can thus be easily scooped up and lifted onto the base plate without using active lifting means.

In an embodiment the first manipulator comprises a clamp unit for clamping the tire component. By clamping the tire component, its position can be easily manipulated by pulling or pushing it in a sliding movement over the support surface.

In an embodiment the tire component has a leading end and a trailing end with respect to the direction of conveyance, wherein the clamp unit is arranged to clamp the trailing end of the tire component. The trailing end can thus be securely clamped and its position on the support surface can be controlled. This is particularly useful when retreading, as the length of the tread during winding application around the buffed carcass is usually controlled by controlling the position of the trailing end with respect to the leading end.

In an embodiment the first manipulator is arranged to push the tire component in the direction of conveyance. By pushing the tire component at its trailing end, the leading end can be moved without the need for clamping the leading end.

In an embodiment the first manipulator comprises a carriage that is arranged between the base plate and the clamp unit, wherein the carriage is arranged to be movable with respect to the base plate in a direction transverse or perpendicular to the direction of conveyance and wherein the clamp unit is arranged to be movable together with the carriage in said direction transverse or perpendicular to the direction of conveyance. The clamp unit can thus be moved relative to the base plate in said transverse direction to follow the trailing end when the trailing end is centered and/or aligned in said transverse direction.

According to a third aspect, the invention provides a method for conveying a tire component, in particular a tread for retreading, with the use of the aforementioned conveyor, wherein the method comprises the step of manipulating the position of the tire component on the stationary support surface by sliding the tire component on the support surface while holding the support surface stationary.

As there are no moving parts in the support surface, the complexity, costs and/or maintenance requirements of the conveyor according to the invention can be reduced significantly with respect to known conveyors.

In an embodiment the manipulation comprises sliding the tire component on the support surface in the direction of conveyance. The surface structure reduces friction and thus facilitates sliding of the tire component relative to the support surface. Thus, despite the support surface being stationary, the tire component can be moved in the direction of conveyance, e.g. towards a drum or a buffed carcass at the downstream end of the conveyor.

In an embodiment the step of sliding the tire component in the direction of conveyance comprises the steps of clamping the trailing end and subsequently pushing the tire component on the support surface by its trailing end in the direction of conveyance. By pushing the tire component at its trailing end, the leading end can be moved without the need for clamping the leading end.

In an embodiment the manipulation comprises sliding the tire component on the support surface in a direction transverse or perpendicular to the direction of conveyance. The surface structure reduces friction and thus facilitates sliding of the tire component relative to the support surface. Thus, despite the support surface being stationary, the tire component can be moved transverse or perpendicular to the direction of conveyance, e.g. for centering and/or alignment purposes.

In a preferred embodiment thereof the sliding of the tire component in the direction transverse or perpendicular to the direction of conveyance is used for centering of the tire component on the support surface in the direction transverse or perpendicular to the direction of conveyance with respect to a center line. Thus the centering relative to the conveyor, the support surface and/or the drum or a buffed carcass may be improved.

In an embodiment the centering comprises a first centering stage in which the tire component is centered prior to conveyance in the direction of conveyance and a second centering stage in which the tire component is centered during the conveyance in the direction of conveyance. The centering in the first stage can improve the centering of the tire component prior to it being conveyed and/or clamped by the first manipulator, while the centering in the second stage can improve the centering and/or alignment of the tire component with respect to the drum or a buffed carcass at the downstream end of the conveyor.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 4A shows a view in perspective of a first centering assembly, used for centering the tire component of FIG. 1 during a first centering stage;

FIG. 4B shows a bottom view of the first centering assembly of FIG. 4A, and in particular the actuator thereof;

DETAILED DESCRIPTION OF THE INVENTION

Figure 1:
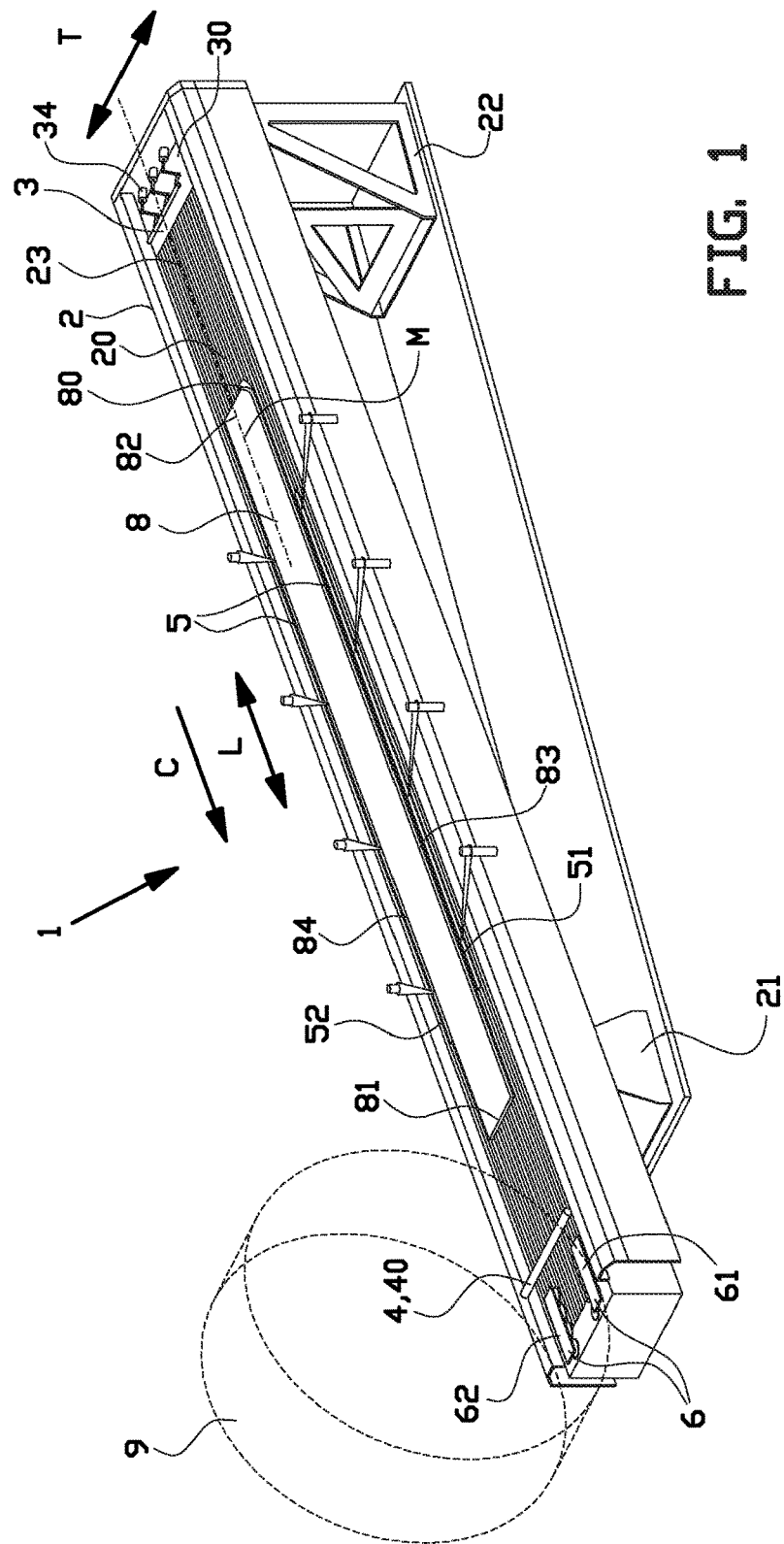
FIG. 1 shows a view in perspective of a conveyor according to the invention, for conveying a tire component.

FIG. 1 shows a conveyor 1 according to the invention, for conveying a tire component 8 towards and/or into abutment with a drum 9.

In this exemplary embodiment, the tire component 8 is a freshly produced tread 8 for retreading purposes and the drum 9 is a retreading drum 9. Retreading is a remanufacturing process in which an old tread of a worn tire, supported on the retreading drum 9, is buffed away from a carcass (not shown) and replaced by the fresh tread 8 supplied by the conveyor 1. The conveyor 1 according to the invention may however also be used for conveying other tire components in other tire building processes.

As shown in FIG. 1, the conveyor 1 comprises a support track 2 that defines a support surface 20 for supporting the tire component 8. The support track 2 is provided with feet 21, 22 that are placed on a factory floor and that hold the support surface 20 at a certain height from the factory floor. In this case, the support surface 20 extends under a slight inclination with respect to the horizontal plane. The support surface 20 is elongate and has a longitudinal direction L, a transverse direction T transverse or perpendicular to the longitudinal direction L and a longitudinally extending center or middle line M that defines the center or mid-point of the support surface 20 in the transverse direction T. At one end, in this case the lower end, the support surface 20 is aligned with and/or underneath the drum 9. The tire component 8 is arranged to be conveyed on the support surface 20 towards the drum 9 in a direction of conveyance C parallel to the longitudinal direction L of the support surface 20.

The tire component 8 is placed with one of its main surface areas 80 in a downwardly facing orientation on the support surface 8. In FIG. 1, a tip of the tire component 8 has been schematically peeled back to reveal the downwardly facing surface area 80. In practice however, the entire tire component 8 lies flat on the support surface 20. The tire component 8 has a leading end 81 facing towards the drum 9 in the direction of conveyance C and a trailing end 82 facing away from the drum 9 in a direction opposite to the direction of conveyance C. The tire component 8 further comprises two longitudinal edges 83, 84 extending parallel to each other between the leading end 81 and the trailing end 82. The tire component 8 is manufactured out of rubberized or elastomeric material, which is usually very tacky and/or has a high sliding resistance. The tire component 8 is therefore not easily moved when using a normal, well known conveyor belt surface. This is why in the state of the art, the conveyor belts are moved or roller conveyors are provided. However, these actively controlled conveyors are complex, require high maintenance and are expensive.

The support surface 20 according to the invention is arranged to be fixed or stationary or to be held fixed or stationary during the conveyance of the tire component 8 in the direction of conveyance C towards the drum 9. In particular, the support surface 20 is fixed or held fixed in the longitudinal direction L, as well as in the transverse direction T. The support surface 20 therefore does not actively contribute to the conveyance of the tire component 8. The support surface 20 can be considered as a passive part of the conveyor 1. As there are no moving parts in the support surface 20, the support surface 20 can be kept very simple, easy to maintain and less expensive.

To facilitate the manipulation and/or positioning of the tire component 8 on the support surface 20 during conveyance, the support surface 20 is provided with a surface profile or surface structure 23 that is arranged to contact only seventy-five percent or less than seventy-five percent, and preferably half or even less than half of the downwardly facing surface area of the tire component 8. The term 'downwardly surface area' is to be interpreted in this context as the surface area of the side of the tire component 8 that faces the support surface 20. The reduced contact area reduces the resistance or friction to sliding of the tire component 8 with respect to the support surface 20.

Figure 2:
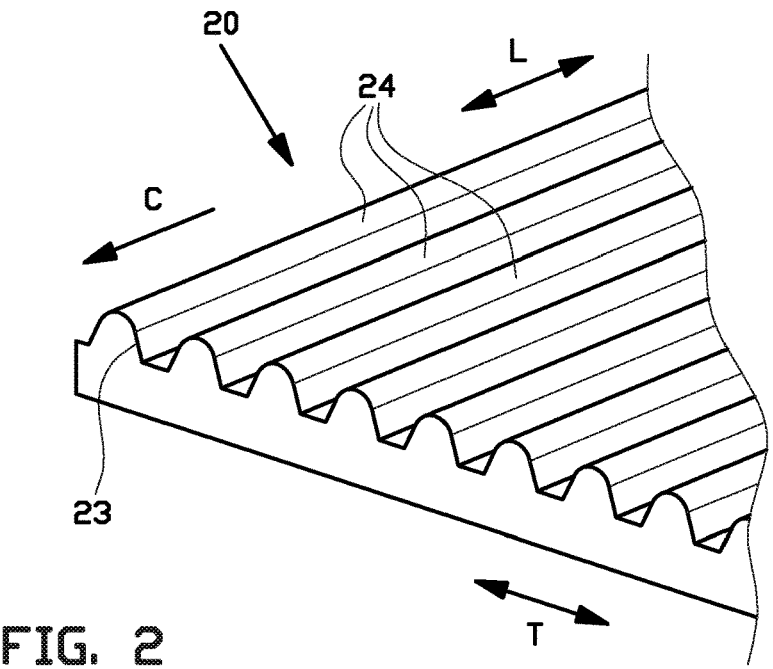
FIG. 2 shows a detail of the surface structure of the conveyor according to FIG. 1.

The surface structure 23 of the support surface 20 is shown in more detail in FIG. 2. In this exemplary embodiment, the surface structure 23 comprises corrugations 24, i.e. a surface structure 23 with alternating, parallel ridges and grooves. The corrugations 24 extend in the longitudinal direction L of the support surface 20, parallel to the direction of conveyance C. The corrugations 24 are evenly distributed in the transverse direction T of the support surface 20. The amount of contact between the corrugations 24 and the downwardly facing surface area 80 of the tire component 8 greatly depends on the stiffness of the tire component 8, and thus the tendency of said tire component 8 to sink into the surface structure 23 or the ability of said tire component 8 to stay on top of the surface structure 23. With a very stiff tire component 8, such as the tread 8 in this example, it is probable that the corrugations 24 contact only a quarter or even less than a quarter of the downwardly facing surface area 80 of the tire component 8. In this exemplary embodiment, the corrugations 24 have an amplitude between the peaks and the troughs of at least five millimeters and/or a distance between the peaks in the transverse direction T of at least fifteen millimeters. The peaks are rounded to prevent damage to the downwardly facing surface area 80 of the tire component 8. In this example, the troughs are truncated to allow for easy cleaning.

The support surface 20 is preferably made of a plastic with a low sliding resistance, for example high modulus polyethylene (HMPE) or ultra-high molecular polyethylene (UHMPE). The plastic is hard enough to prevent wear and easy to clean.

The aforementioned surface structure 23 greatly reduces the amount of friction that is generated between the tire component 8 and the support surface 20, thereby facilitating sliding movement of the tire component 8 with respect to the stationary support surface 20. The sliding movement comprises conveyance of the tire component 8 in the longitudinal direction L, parallel to or in the direction of conveyance C, but may also comprise alignment and/or centering of the tire component 8 in the transverse direction T of the support surface 20.

To effectuate the sliding movement of the tire component 8 with respect to the stationary support surface 20, the conveyor 1 according to the invention is provided with a plurality of manipulators. The manipulators are arranged to engage or to abut the tire component 8 and to subsequently push and/or pull the tire component in a sliding movement over the stationary support surface 20 into the desired position. In this exemplary embodiment, the plurality of manipulators comprises a first manipulator in the form of a trailing end gripper 3, a second manipulator in the form of a leading end gripper 4, a third manipulator in the form of a first centering assembly 5 and a fourth manipulator in the form of a second centering assembly 6. The details of these four manipulators will be described hereafter.

Figure 3:
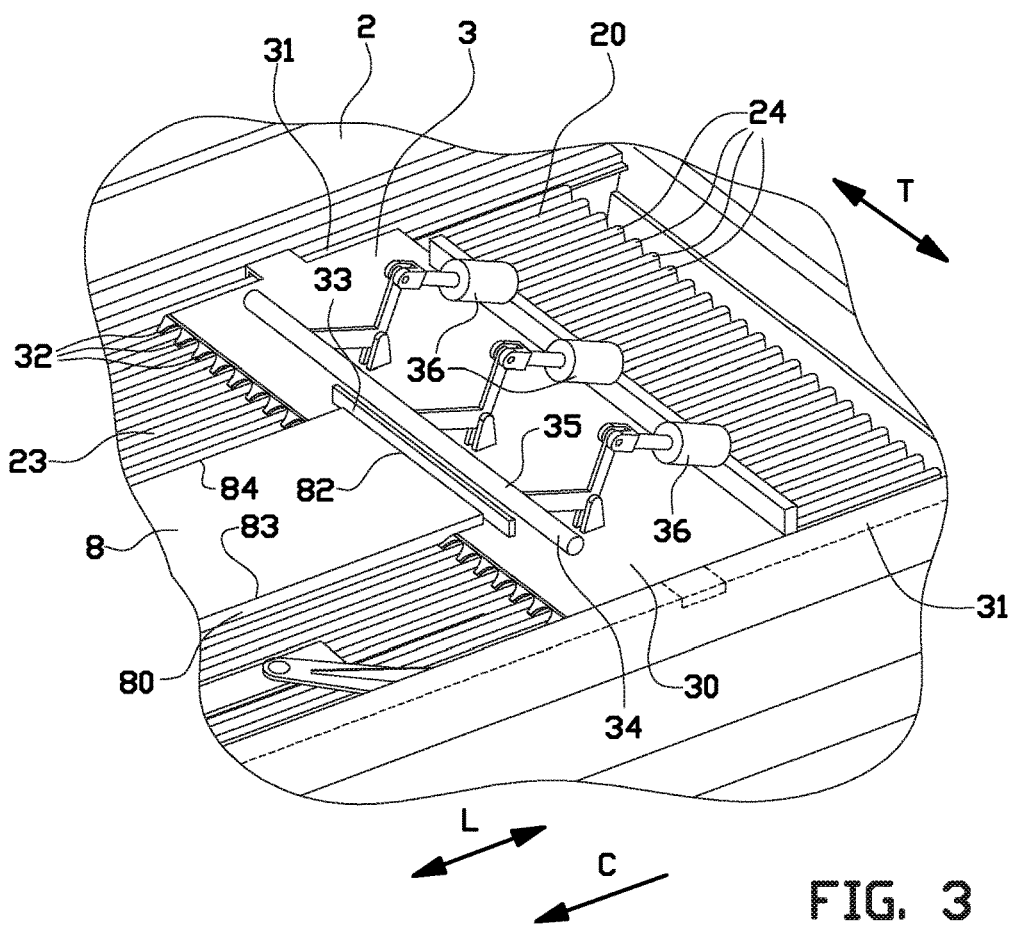
FIG. 3 shows a view in perspective of a trailing end clamp, used for clamping the trailing end of the tire component of FIG. 1.

As shown in FIGS. 1 and 3, the trailing end gripper 3 comprises a base plate 30 that is arranged to be placed on top of the support surface 20, upstream of the tire component 8 with respect to the direction of conveyance C. The base plate 30 is placed on guides 31 extending in the direction of conveyance C. The trailing end gripper 3 is operationally coupled to a drive (not shown) that is arranged for moving or driving the trailing end gripper 3 parallel to the longitudinal direction L in the direction of conveyance C towards and into abutment with the trailing end 82 of the tire component 8. As the trailing end gripper 3 is moved in the direction of conveyance C, the base plate 30 simply slides over the support surface 20. At the side of the trailing end gripper 3 that faces in the direction of conveyance C, towards the tire component 8, the base plate 30 is provided with a plurality of cleats or teeth 32 that extend downwards under an oblique angle and mesh with or fit in between the corrugations 24. The plurality of teeth 32 form an inclined, comb-like run-on surface that blends or merges with the main surface of the base plate 30.

When the trailing end gripper 3 is moved in the direction of conveyance C into abutment with the trailing end 82 of the tire component 8, the teeth 32 of the base plate 30 scoop, extend or reach underneath the tire component 8. When the trailing end gripper 3 is subsequently moved further in the direction of conveyance C, the teeth 32 lift or deflect the trailing end 82 upwards and force it onto the base plate 30. On top of the base plate 30, the trailing end gripper 3 is provided with a stopper or abutment element 33 extending in the transverse direction T. The abutment element 33 is arranged directly opposite to the trailing end 82 of the tire component 8 in the longitudinal direction L. As soon as the trailing end 82 abuts the abutment element 33, the drive of the trailing end gripper 3 will experience a higher load, which is indicative of the trailing end 82 being in position at the abutment element 33. When the higher load is detected, the drive is stopped.

As shown in FIG. 3, the trailing end gripper 3 is provided with a clamp unit 34 for securely clamping the trailing end 82 of the tire component 8 on the base plate 30. The clamp unit 34 comprises a clamping element 35, in this example in the form of a rod or a bar, extending in the transverse direction T. The clamping element 35 is hingably or pivotally connected to the base plate 30 so as to be rotatable about a clamping axis S. The trailing end gripper 3 is provided with a clamp actuator 36, in this example in the form of three pneumatic or hydraulic cylinders. The clamp actuator 36 is coupled to the clamping element 35 to move said clamping element 35 in a rotation about the clamping axis S into clamping abutment with the trailing end 82 at or near the abutment element 33. The trailing end 82 is arranged to be securely clamped between the clamping element 35 and the base plate 30.

Figure 5A:
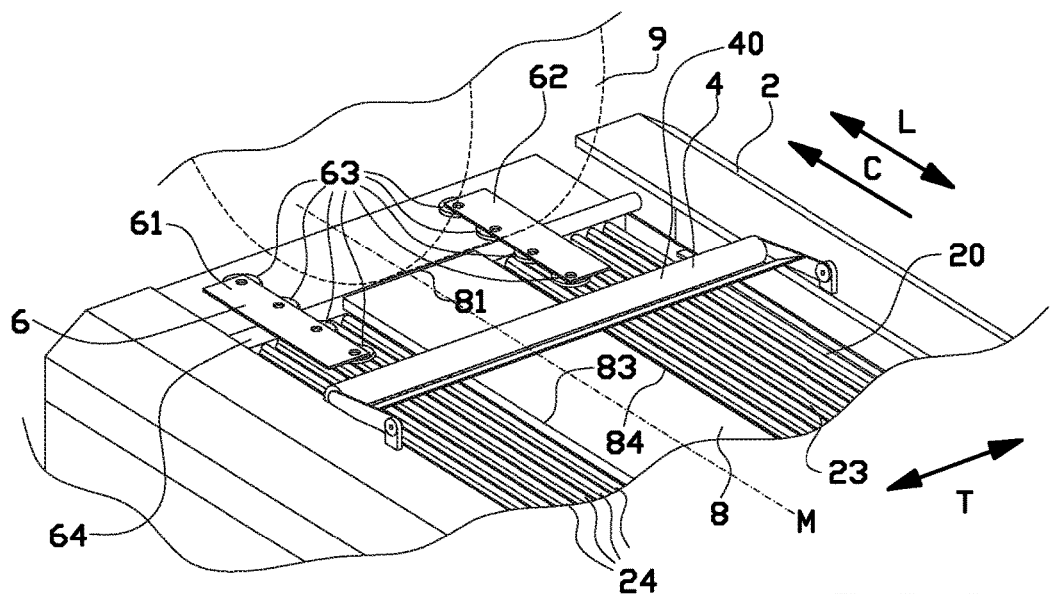
FIG. 5A shows a view in perspective of a leading end clamp, used for clamping the leading end of the tire component of FIG. 1, and a second centering assembly, used for centering the tire component of FIG. 1 during a second centering stage.

It can be observed in FIG. 5A that the leading end gripper 4 comprises a clamping bar or rod 40 that is held down under the influence of gravity to hold down the tire component 8 on the support surface 20 as the tire component 8 passes underneath. In an alternative embodiment, the clamping bar or rod 40 of the leading end gripper 4 may be actively held down by an actuator (not shown).

As shown in FIGS. 1, 4A and 4B, the first centering assembly 5 is arranged for centering the tire component 8 with respect to the middle line M on the support surface 20 prior to conveyance in the direction of conveyance C and/or during the conveyance in the direction of conveyance C. The centering takes place in the transverse direction T. The first centering assembly 5 comprises a first centering guide 51 and a second centering guide 52 which are movably placed on top of the support surface 20, extending parallel to the longitudinal direction L alongside and opposite to first longitudinal edge 83 and the second longitudinal edge 84, respectively. In this exemplary embodiment, the first centering guide 51 and the second centering guide 52 are formed as bars or rods which are arranged to contact and/or abut the tire component 8 at the longitudinal edges 83, 84. The first centering guide 51, and the second centering guide 52 are positioned symmetrically, one on each side of the middle line M of the support surface 20 and are arranged to move symmetrically towards and away from said middle line M to center the tire component 8 with respect to the middle line M.

As shown in FIG. 4A, the first centering assembly 5 comprises a first set of mutually parallel arms 53 and a second set of mutually parallel arms 54 which are rotatable about vertically extending rotational axes R. The first sets of arms 53 and the second set of arms 54 are rotationally coupled to the first centering guide 51 and the second centering guide 52, respectively. The sets of arms 53, 54 are rotatable to such an extent, that the first centering guide 51 and the second centering guide 52 are moved out of the way of the trailing end gripper 3 in the direction of conveyance C. As shown in FIG. 4B, the first centering assembly 5 is provided with a first centering actuator 55 that is arranged to actuate the aforementioned symmetrical movement of the first centering guide 51 and the second centering guide 52 towards and away from the middle line M via the aforementioned arms 53, 54. The first centering actuator 55 comprises a single linear drive that is arranged to drive both the first centering guide 51 and the second centering guide 52 simultaneously. In this example, the single linear drive is formed as a single pneumatic or hydraulic cylinder 56 with a piston 57 that is reciprocally movable in the longitudinal direction L.

The first centering actuator 55 further comprises a first link mechanism 58 and a second link mechanism 59, one for each of the first centering guide 51 and the second centering guide 52, respectively. The first link mechanism 58 couples the linear drive 56, 57 to at least one of the arms of the first set of arms 53 and the second link mechanism 59 couples the linear drive 56, 57 to at least one of the arms of the second set of arms 54. The link mechanisms 58, 59 are arranged to symmetrically convert the reciprocal movement of the piston 55 in the longitudinal direction L into a rotational movement of the directly coupled arms of the sets of arms 53, 54. The rotational movements of the coupled arms of the set of arms 53, 54 are imposed on the other arms of the set of arms 53, 54. As the set of arms 53, 54 move, the first centering guide 51 and the second centering guide 52 are moved symmetrically inwards or outwards with respect to the middle line M.

Figure 5B:
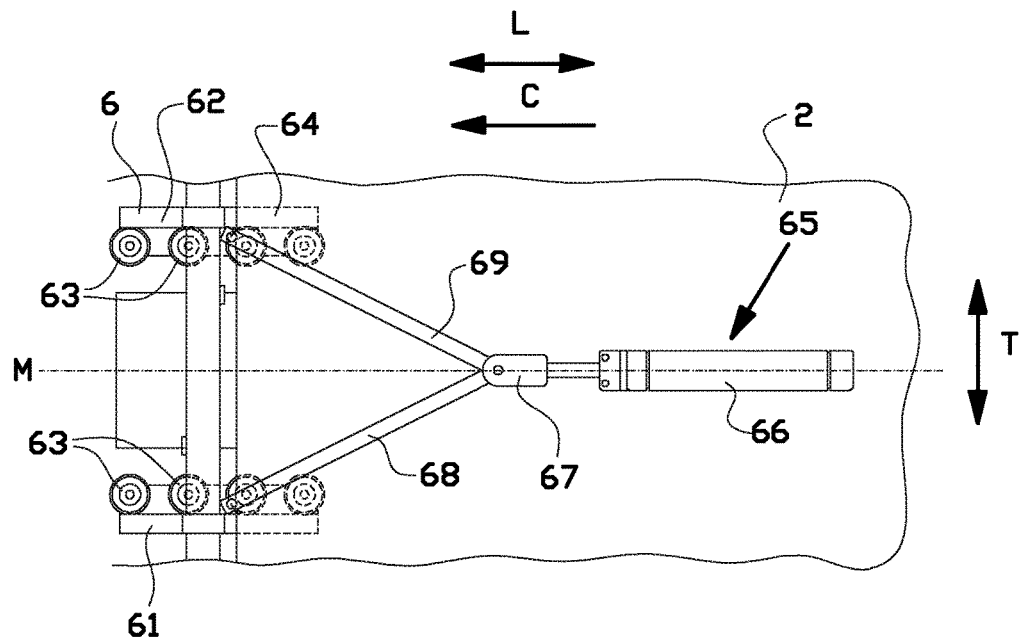
FIG. 5B shows a bottom view of the second centering assembly of FIG. 5A, and in particular the actuator thereof.

As shown in FIGS. 1, 5A, and 5B, the second centering assembly 6 is arranged for centering the tire component 8 with respect to the middle line M on the support surface 20 prior to or at the transfer of the tire component from the support track 2 to the drum 9. The second centering assembly 6 is arranged downstream from the first centering assembly 5 in the direction of conveyance C. The centering takes place in the transverse direction T. The second centering assembly 6 comprises a third centering guide 61 and a fourth centering guide 62 which extend at least partially over the support surface 20 at or near the downstream end thereof, and which extend towards the drum 9. The third centering guide 61 and the fourth centering guide 62 extend parallel to the longitudinal direction L alongside and opposite to the first longitudinal edge 83 and the second longitudinal edge 84, respectively. The third centering guide 61 and the fourth centering guide 62 are positioned symmetrically, one on each side of the middle line M of the support surface 20 and are arranged to move symmetrically towards and away from said middle line M to center the tire component 8 with respect to the middle line M. The third centering guide 61 and the fourth centering guide 62 are provided with a plurality of wheels 63 which are arranged to contact and/or to abut the longitudinal edges 83, 84 of the tire component 8 while the latter is moved in the direction of conveyance C. The plurality of wheels 63 facilitates or allows a relatively unrestricted movement of the tire component 8 with respect to the third centering guide 61 and the fourth centering guide 62 in the direction of conveyance C, while the plurality of wheels 63 impose a centering force on the longitudinal edges 83, 84 in the transverse direction T.

Alternatively, the third centering guide 61 and the fourth centering guide 62 may be formed as bars or rods, similar to those of the first centering guide 51 and the second centering guide 52. Preferably, these bars or rods are made of a low resistance material, such as the same material as the support surface 20, to allow relative sliding movement of the tire component 8 with respect to the third centering guide 61 and the fourth centering guide 62 in the direction of conveyance C.

As shown in FIG. 5B, the third centering guide 61 and the fourth centering guide 62 are slidably supported on a transversely extending sliding bar 64, so as to be movable in the transverse direction T. Similar to the first centering assembly 5 as shown in FIG. 4B, the second centering assembly 6 as shown in FIG. 5B is provided with a second centering actuator 65 that is arranged to actuate the aforementioned symmetrical movement of the third centering guide 61 and the fourth centering guide 62 towards and away from the middle line M. The second centering actuator 65 comprises a single linear drive that is arranged to drive both the third centering guide 61 and the fourth centering guide 62 simultaneously. In this example, the single linear drive is a single pneumatic or hydraulic cylinder 66 with a piston 67 that is reciprocally movable in the longitudinal direction L.

The second centering actuator 65 further comprises a third link mechanism 68 and a fourth link mechanism 69, one for each of the third centering guide 61 and the fourth centering guide 62, respectively. The third link mechanism 68 couples the linear drive 66, 67 to third centering guide 61 and the fourth link mechanism 69 couples the linear drive 66, 67 to the fourth centering guide 62. The link mechanisms 68, 69 are arranged to symmetrically convert the reciprocal movement of the piston 65 in the longitudinal direction L into a sliding movement of the third centering guide 61 and the fourth centering guide 62 in the transverse direction T.

The method for conveying and/or centering the aforementioned tire component 8 with the use of the aforementioned conveyor 1 will be described hereafter with reference to FIGS. 1-5B.

FIG. 1 shows the situation in which the tire component 8 is placed on the stationary support surface 20 of the support track 2 at a distance spaced apart and upstream from the drum 9. The tire component 8 is preferably placed in between the first centering guide 51 and the second centering guide 52 of the first centering assembly 5. The placement is typically performed manually, in particular with treads 8 in methods for retreading. Alternatively, the placement may be performed by a robot (not shown) or the tire component 8 may be delivered from another upstream station by another conveyor (not shown).

With the tire component 8 on the support surface 20, the conveyor 1 is activated to convey and/or center the tire component 8 with respect to the drum 9.

In this exemplary embodiment, the tire component 8 is centered with respect to the middle line M in two centering stages. The first stage is performed by the first centering assembly 5 and occurs prior to conveying the tire component 8 into the direction of conveyance C towards the drum 9. In particular, the tire component 8 is centered prior to the trailing end clamp 3 engaging the trailing end 82 of the tire component 8. Thus, the tire component 8 is not engaged and can be freely manipulated in the transverse direction T by the first centering assembly 5 for the purpose of centering. The first centering actuator 55, as shown in FIG. 4B, is actuated to move the first centering guide 51 and the second centering guide 52 symmetrical inwards towards the respective longitudinal edges 83, 84 of the tire component 8. When the tire component 8 is not optimally aligned and/or centered on the stationary support surface 20, one of the first centering guide 51 and the second centering guide 52 will contact the tire component 8 first and will force the tire component 8 in a sliding movement over the stationary support surface 20 towards the other of the centering guides 51, 52. The surface structure 23, as shown in FIG. 2, reduces the friction between the tire component 8 and the support surface 20, to facilitate the sliding movement of the tire component 8 in the transverse direction T relative to the stationary support surface 20. Once both the first centering guide 51 and the second centering guide 52 are substantially or fully in contact with the respective longitudinal edges 83, 84, the tire component 8 is substantially aligned and/or centered with respect to the middle line M. The first stage of the centering has now been completed and the tire component 8 is ready to be conveyed in the direction of conveyance C.

For the purpose of conveying, the tire component 8 is engaged by the first manipulator, in this exemplary embodiment in the form of the trailing end gripper 3. The trailing end gripper 3 is moved by its drive in the direction of conveyance C until the teeth 32 of the base plate 30 reach underneath the trailing end 82 of the tire component 8. The trailing end 82 of the tire component 8 is lifted onto the base plate 30 and into abutment with the abutment element 33, after which the drive is stopped. Subsequently, the clamp unit 34 is actuated to clamp the trailing end 82 onto the base plate 30. The trailing end 82 is now securely clamped and its position on the support surface 20 can be manipulated by controlled movement of the trailing end clamp 3. In this particular embodiment, the trailing end clamp 3 is used to push the tire component 8 in a sliding movement over the support surface 20 forwards or downstream in the direction of conveyance C towards the drum 9. As the trailing end gripper 3 moves in the direction of conveyance C, its teeth 32 mesh with the corrugations 24 in the surface structure 23, such that the corrugations 24 guide the movement of the trailing end gripper 3 in the direction of conveyance C. Again, the surface structure 23, as shown in FIG. 2, reduces the friction between the tire component 8 and the support surface 20, to facilitate the sliding movement of the tire component 8 in the direction of conveyance C relative to the stationary support surface 20.

Alternatively, other manipulators may be used, and the tire component 8 may be engaged at another position than the trailing end 82, e.g. at the leading end 81. Naturally, in a case in which the leading end 81 is engaged, the tire component 8 would be pulled, instead of pushed, in the direction of conveyance C towards the drum 9.

As the tire component 8 is conveyed in the direction of conveyance C towards the drum 9, it is received underneath the clamping rod 40 of the leading end gripper 4. The leading end 81 of the tire component 8 passes underneath under the influence of the driving force of the first manipulator, in this exemplary embodiment the trailing end gripper 3, in the direction of conveyance C. The leading end is subsequently received between the third centering guide 61 and the fourth centering guide 62 of the second centering assembly 6 for further alignment and/or centering in the second centering stage.

As soon as a considerable part of the tire component 8 has been introduced in between the third centering guide 61 and the fourth centering guide 62 of the second centering assembly 6, the second centering assembly 6 is actuated to center the tire component 8 in the second centering stage. In retreading methods, this second stage of the centering will start when the leading end 81 of the tread 8 has been attached to the buffed carcass at the drum 9. The second centering stage is used to correct or reduce any remaining misalignment or to optimize the centering and/or alignment with respect to the drum 9. Similar to the centering in the first stage, one of the third centering guide 61 and the fourth centering guide 62 will contact the tire component 8 first and will force the tire component 8 in a sliding movement over the stationary support surface 20 towards the other of the centering guides 61, 62. The surface structure 23, as shown in FIG. 2, reduces the friction between the tire component 8 and the support surface 20, to facilitate the movement of the tire component 8 in the transverse direction T relative to the stationary support surface 20. Once both the third centering guide 61 and the fourth centering guide 62 are substantially or fully in contact with the respective longitudinal edges 83, 84, the tire component 8 is aligned and/or centered with respect to the middle line M and/or the drum 9. The second stage centering by the second centering assembly 6 continues while the tire component 8 is conveyed in the direction of conveyance C until the trailing end 82 of the tire component 8 has passed the second centering assembly 6.

Shortly prior to the trailing end 82 passing through the second centering assembly 6, the trailing end gripper 3 disengages from the trailing end 82 of the tire component 8 to avoid interference of the trailing end gripper 3 with the second centering assembly 6. The trailing end gripper 3 is moved backwards or upstream towards its original starting position for a next cycle of the method.

With the aforementioned method, the tire component can be conveyed and/or centered with the relatively simple, low maintenance conveyor 1 according to the invention. In particular the use of a stationary support surface 20 significantly reduces the amount of maintenance required and further reduces the complexity and the costs of the conveyor 1. Because of the surface structure 3 as shown in FIG. 2, the tire component 8 can still be manipulated in both the transverse direction T and the longitudinal direction L with a reduced friction and thus relatively small efforts.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 6:
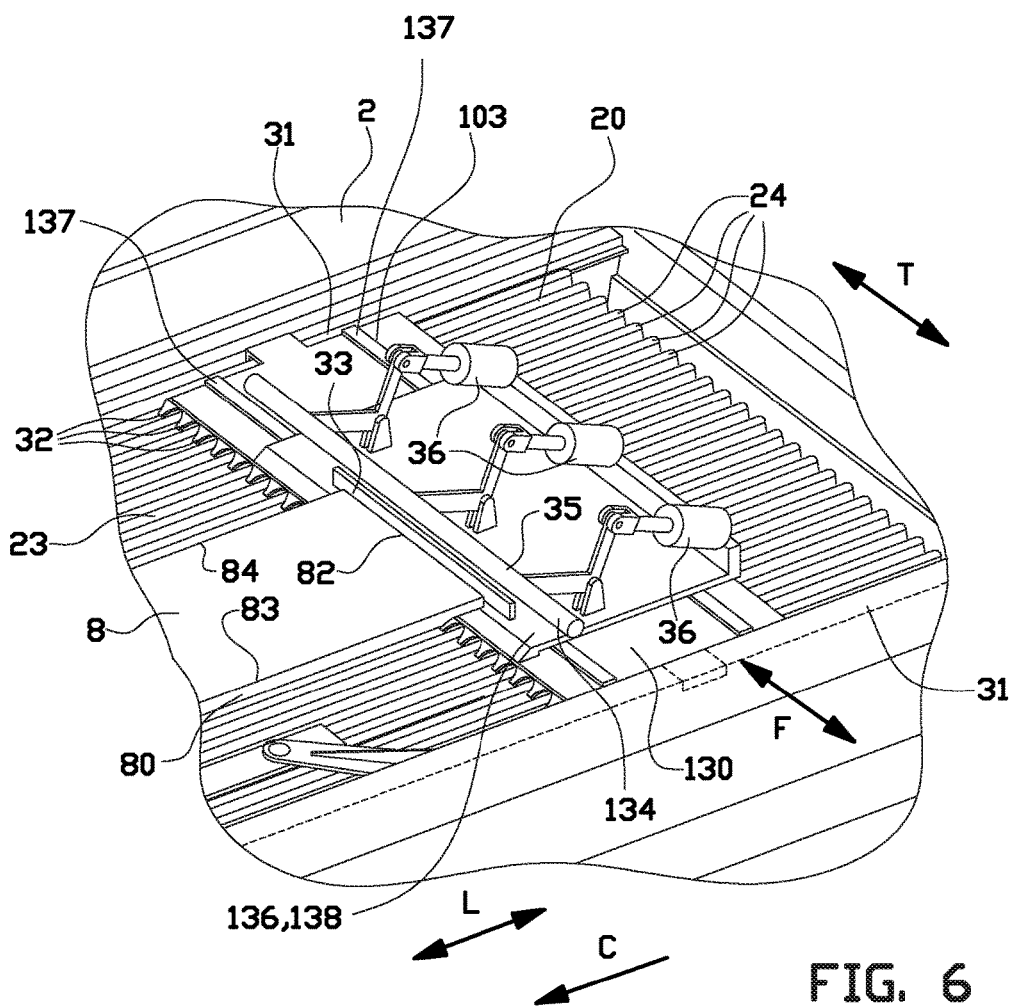
FIG. 6 shows a view in perspective of an alternative trailing end clamp, according to a second embodiment of the invention.

For example, an alternative trailing end clamp 103 may be provided in combination with the aforementioned conveyor 1, as shown in FIG. 6. The clamp unit 134 of the alternative trailing end clamp 103 is mounted on a carriage 136. The carriage 136 is movable mounted to the base plate 130, for example on a set of rails 137, so that the clamp unit 134 can freely move in the transverse direction T with respect to the base plate 130. The carriage 136 is provided with a carrying surface 138, wherein the comb-like run-on surface of the base plate 130 is arranged to lift the trailing end 82 of the tire component 8 onto the carrying surface 138. This allows for the carriage 136 and the clamp unit 134 mounted thereon to follow the trailing end 82 of the tire component 8 when the trailing end 82 is displaced in the transverse direction T, for example due to further centering by the first centering assembly 5 and/or the second centering assembly 6. The disclosure of Dutch patent application No. 2013038 is hereby included by reference. In this Dutch patent, a clamping member (clamping unit 134) is mounted on a floating base member (carriage 136) which is freely movable with respect to a fixed base member (base plate 130) in a floating direction (transverse direction T) transverse to a supply direction (direction of conveyance C).

The aforementioned trailing end grippers 3, 103 can also be used as a leading end gripper (not shown), in which case the gripper would be mirrored such that the teeth of the base plate are directed towards the leading end 81 of the tire component 8. In this exemplary embodiment, the conveyor 1 is however provided with the leading end gripper 4 as shown in FIG. 5A.

Figure 7:
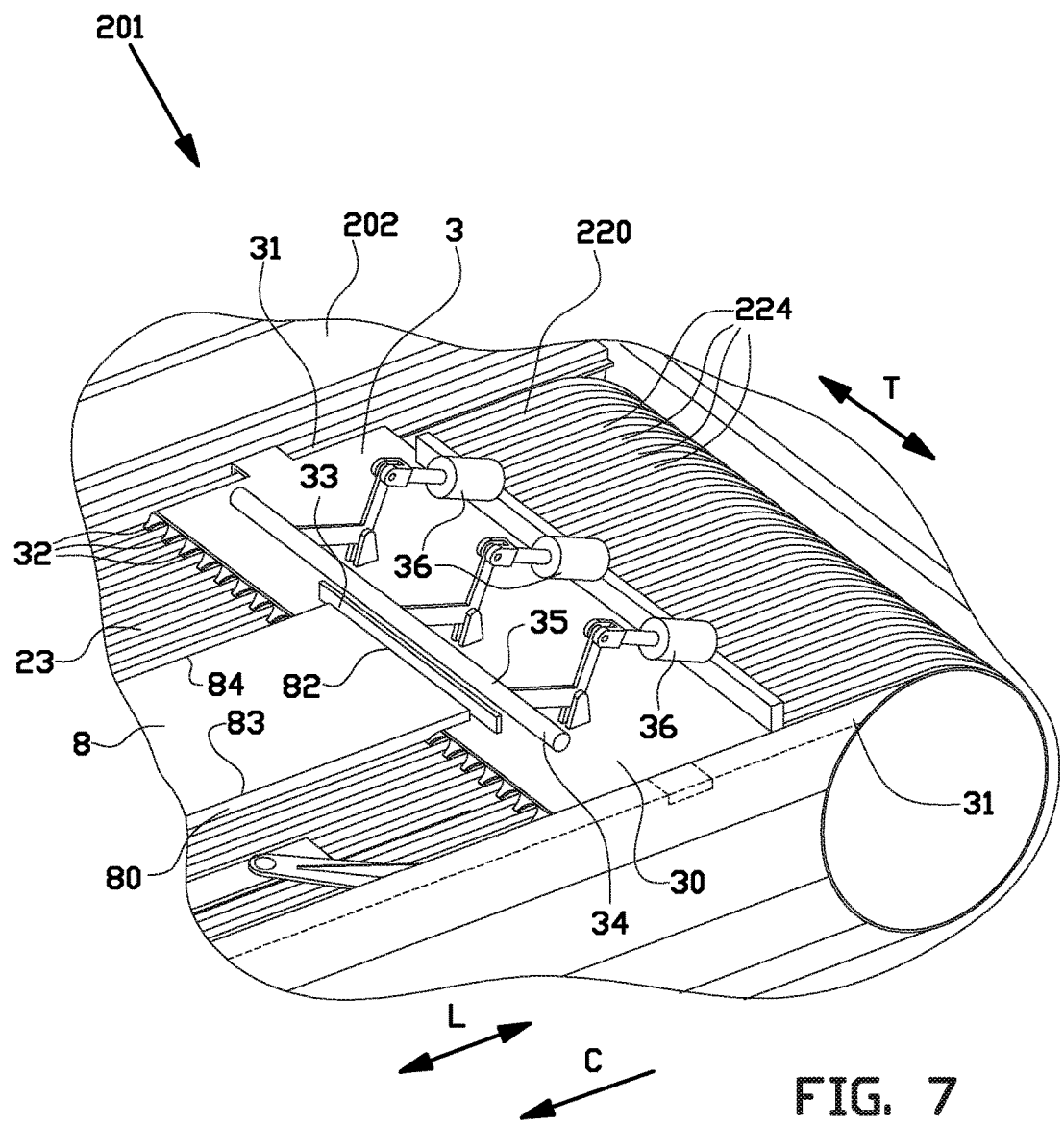
FIG. 7 shows a view in perspective of the trailing end clamp according to FIG. 3, that is being used in combination with an alternative conveyor according to a third embodiment of the invention.

The trailing end grippers 3, 103 can further be used in combination with an alternative conveyor 201, as shown in figure in which the support surface 220 of the support track 202 is formed by an endless belt conveyor 220. Contrary to the support surface 20 in FIGS. 1-5B, the support surface 220 in FIG. 7 is thus arranged to be movable in the direction of conveyance C to actively transport the tire component 8. The support surface 220 formed by the endless conveyor belt 220 is provided with the same corrugations 224 as the support surface 20 in FIG. 2. The corrugations 224 extend in the direction of conveyance C. Thus, the trailing end grippers 3, 103 can be operated on the alternative conveyor 201 in the same manner as the conveyor 1 of FIGS. 1-5B by meshing their respective teeth into the corrugations 224 and to subsequently pick up and clamp the trailing end 82 of the tire component 8. In this embodiment, the corrugations 224 are primarily used to guide the trailing end grippers 3, 103. The corrugations 224 may however also contribute to reducing the resistance between the endless conveyor belt 220 and the tire component 8, in particular in the transverse direction T for the purpose of alignment and/or centering. The trailing end grippers 3, 103 can be used to control the position of the trailing end 81 and/or the length of the tire component 8 by holding the trailing end 81 back and thus sliding it over the endless conveyor belt 220 in the direction of conveyance. In this embodiment however, sliding the tire component 8 in the direction of conveyance C is not the main purpose of the trailing end clamp 3. The conveyance of the tire component 8 in the direction of conveyance C is actively driven by the endless conveyor belt 220.

The invention claimed is:

1. A conveyor for conveying a tire component, wherein the conveyor comprises a support surface that extends in a direction of conveyance to support the tire component during conveyance in the direction of conveyance, wherein the support surface is provided with corrugations extending in the direction of conveyance, wherein the conveyor is provided with one or more manipulators to manipulate the position of the tire component, wherein the one or more manipulators comprises a first manipulator that is provided with a base plate that is movable in a direction parallel to the direction of conveyance towards the tire component, wherein the base plate is provided with a plurality of teeth which are arranged to mesh with the corrugations and which form an inclined comb-like run-on surface for lifting the tire component onto the base plate when the base plate is moving towards the tire component.

2. The conveyor according to claim 1, wherein the first manipulator comprises a clamp unit for clamping the tire component.

3. The conveyor according to claim 2, wherein the tire component has a leading end and a trailing end with respect to the direction of conveyance, wherein the clamp unit is arranged to clamp the trailing end of the tire component.

4. The conveyor according to claim 3, wherein the first manipulator is arranged to push the tire component in the direction of conveyance.

5. The conveyor according to claim 2, wherein the first manipulator comprises a carriage that is arranged between the base plate and the clamp unit, wherein the carriage is arranged to be movable with respect to the base plate in a direction transverse or perpendicular to the direction of conveyance and wherein the clamp unit is arranged to be movable together with the carriage in said direction transverse or perpendicular to the direction of conveyance.

6. The conveyor according to claim 1, wherein the first manipulator is arranged for sliding the tire component on the support surface in the direction of conveyance.

7. The conveyor according to claim 1, wherein the one or more manipulators comprises a second manipulator that is arranged to hold down the tire component on the support surface at a position downstream of the first manipulator in the direction of conveyance.

8. The conveyor according to claim 1, wherein the one or more manipulators comprises a third manipulator that is arranged for sliding the tire component on the support surface in a direction transverse or perpendicular to the direction of conveyance.

9. The conveyor according to claim 8, wherein the third manipulator is arranged for centering the tire component in the direction transverse or perpendicular to the direction of conveyance with respect to a center line.

10. The conveyor according to claim 9, wherein the tire component comprises longitudinal edges, wherein the third manipulator comprises a first centering guide and a second centering guide which are movably placed on the support surface, one opposite to each of the longitudinal sides, wherein the first centering guide and the second centering guide are arranged to move symmetrically towards each other with respect to the center line into abutment with the respective longitudinal edges.

11. The conveyor according to claim 10, wherein the third manipulator comprises a first centering actuator which is arranged to actuate the symmetrical movement of the first centering guide and the second centering guide.

12. The conveyor according to claim 11, wherein the first centering actuator comprises a single linear drive that is arranged to drive both the first centering guide and the second centering guide simultaneously.

13. The conveyor according to claim 12, wherein the first centering actuator comprises a first link mechanism and a second link mechanism that couple the single linear drive to the first centering guide and the second centering guide, respectively, for converting the driving movement of the single linear drive into the symmetrical movement of the first centering guide and the second centering guide.

14. The conveyor according to claim 8, wherein the one or more manipulators comprises a fourth manipulator that is placed downstream of the third manipulator in the direction of conveyance, wherein the fourth manipulator is arranged for moving the tire component on the support surface in a direction transverse or perpendicular to the direction of conveyance.

15. The conveyor according to claim 14, wherein the fourth manipulator comprises a third centering guide and a fourth centering guide which are arranged to move symmetrically towards each other with respect to a center line into abutment with the respective longitudinal edges, wherein the third centering guide and the fourth centering guide are each provided with a plurality of wheels which are arranged to abut the respective longitudinal edge and which allow for movement of the tire component in the direction of conveyance relative to the fourth manipulator.

16. The conveyor according to claim 15, wherein the third manipulator is arranged for centering the tire component in the direction transverse or perpendicular to the direction of conveyance with respect to a center line, wherein the tire component comprises longitudinal edges, wherein the third manipulator comprises a first centering guide and a second centering guide which are movably placed on the support surface, one opposite to each of the longitudinal sides, wherein the first centering guide and the second centering guide are arranged to move symmetrically towards each other with respect to the center line into abutment with the respective longitudinal edges, wherein the third centering guide and the fourth centering guide are arranged to be symmetrical movable in the same manner as the first centering guide and the second centering guide.

17. The conveyor according to claim 16, wherein the third centering guide and the fourth centering guide are driven by a second centering actuator which is arranged to actuate the symmetrical movement of the third centering guide and the fourth centering guide.

18. The conveyor according to claim 1, wherein the support surface is fixed with respect to the direction of conveyance and the direction transverse or perpendicular to the direction of conveyance.

19. A method for conveying a tire component, wherein the method comprises:
  a step of providing a conveyor for conveying a tire component, wherein the conveyor comprises a support surface that extends in a direction of conveyance to support the tire component during conveyance in the direction of conveyance, wherein the support surface is provided with corrugations extending in the direction of conveyance, wherein the conveyor is provided with one or more manipulators to manipulate the position of the tire component, wherein the one or more manipulators comprises a first manipulator that is provided with a base plate that is movable in a direction parallel to the direction of conveyance towards the tire component, wherein the base plate is provided with a plurality of teeth which are arranged to mesh with the corrugations and which form an inclined comb-like run-on surface for lifting the tire component onto the base plate when the base plate is moving towards the tire component; and
  a step of manipulating the position of the tire component on the stationary support surface by sliding the tire component on the support surface while holding the support surface stationary.

20. The method according to claim 19, wherein the step of manipulation comprises a step of sliding the tire component on the support surface in the direction of conveyance.

21. The method according to claim 20, wherein the tire component has a leading end and a trailing end with respect to the direction of conveyance, wherein the step of sliding the tire component in the direction of conveyance comprises a step of clamping the trailing end and a step of subsequently pushing the tire component on the support surface by the trailing end in the direction of conveyance.

22. The method according to claim 19, wherein the step of manipulation comprises a step of sliding the tire component on the support surface in a direction transverse or perpendicular to the direction of conveyance.

23. The method according to claim 22, wherein the step of sliding of the tire component in the direction transverse or perpendicular to the direction of conveyance is used for a step of centering of the tire component on the support surface in the direction transverse or perpendicular to the direction of conveyance with respect to a center line.

24. The method according to claim 23, wherein the step of centering comprises a first centering stage in which the tire component is centered prior to conveyance in the direction of conveyance and a second centering stage in which the tire component is centered during the conveyance in the direction of conveyance.

* * * * *